Oct. 18, 1932.  F. E. CARLSON  1,883,548
WEIGHING SCALE
Filed May 23, 1930   2 Sheets-Sheet 1
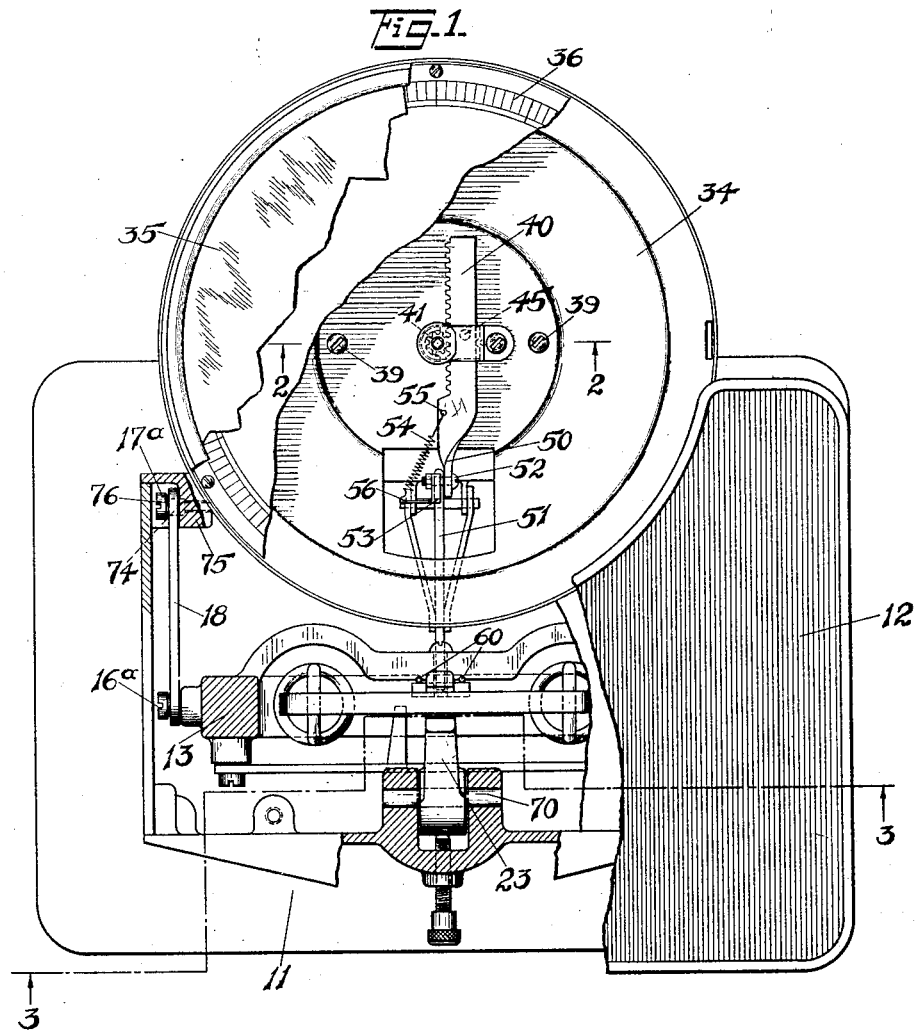
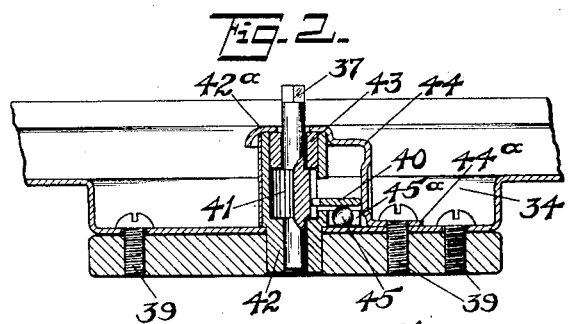
Inventor
Frederick E. Carlson
By his Attorneys

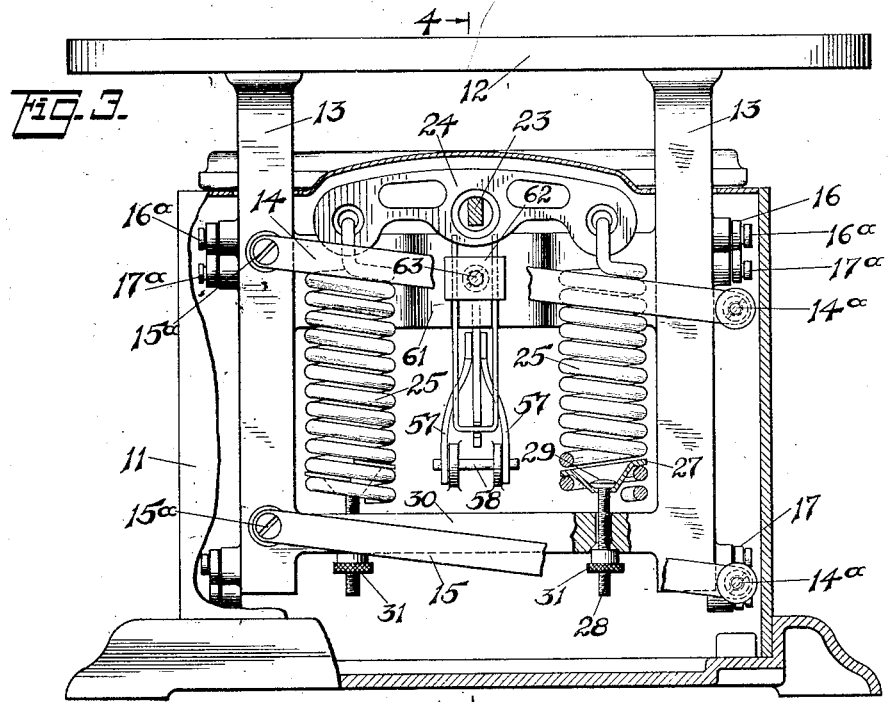
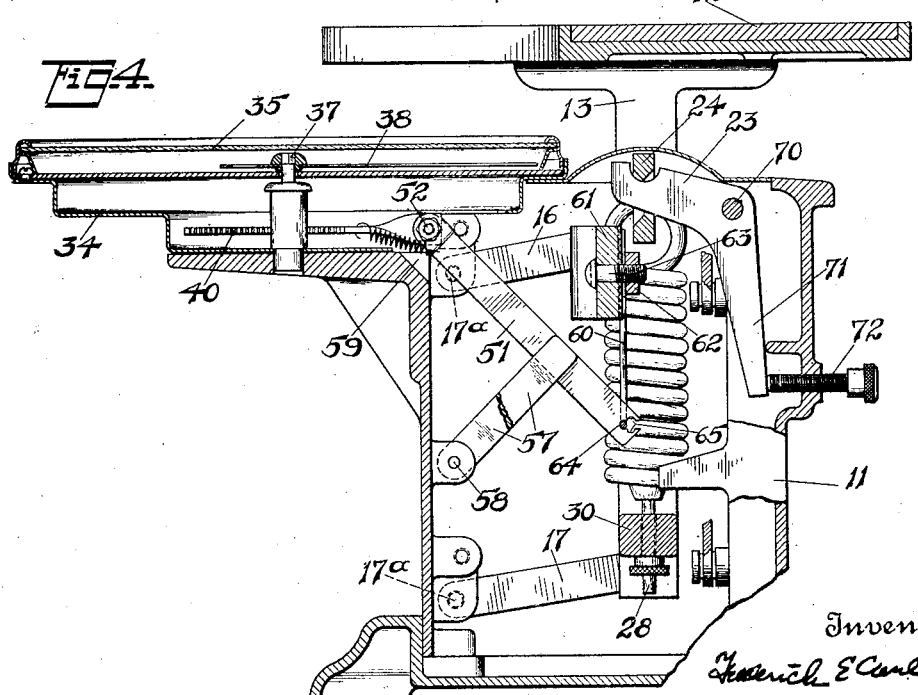

Patented Oct. 18, 1932

1,883,548

UNITED STATES PATENT OFFICE

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT

WEIGHING SCALE

Application filed May 23, 1930. Serial No. 454,952.

This invention relates to weighing scales and more particularly to scales of the so-called bathroom type.

It is an object of the invention to provide a bathroom scale with a horizontal dial facing upwardly to be viewed conveniently by a person standing on the scale platform.

It is a further object of the invention to provide a scale of simple, economical and sensitive construction that gives accurate scale readings.

With these general objects in view, the invention consists in the features, combinations, details of construction and arrangements of parts which will first be described in connection with the accompanying drawings and then more particularly pointed out.

In the drawings:

Figure 1 is a plan view, partly broken away and in section, of a scale constructed in accordance with the invention;

Figure 2 is a sectional elevational view taken as on line 2—2 of Figure 1;

Figure 3 is a sectional elevational view taken as on line 3—3 of Figure 1; and

Figure 4 is a sectional elevational view taken as on line 4—4 of Figure 3.

Referring to the drawings, the scale here illustrated as an example comprises a main or stationary frame 11 for seating on a floor or other support. A weighing platform 12 is carried by a movable frame 13 largely enclosed within the stationary frame. The movable platform frame is connected with the stationary frame to have its movement guided in two right-angled directions. To this end, as here shown as an example, at the rear of the scale are upper and lower guiding links 14, 15. One end of each link is pivoted to the stationary frame at 14a, the other end to the movable frame at 15a. At one side of the scale are upper and lower guiding links 16, 17, extending at right angles to the links 14, 15. One end of each of these links is pivoted to the movable frame at 16a, the other end to the stationary frame at 17a. At the other side of the scale, and parallel to links 16, 17, are similar links 18, pivoted in like manner. By means of these several links, the movable frame is guided or controlled in its movements.

There is provided a weighing-spring connection between the movable frame and stationary frame. To this end, as here shown as an example, pivotally hung on a supporting hanger 23 carried by the stationary frame is a spring-equalizing yoke 24. A pair of weighing springs 25 have their upper ends hooked into suitable holes in yoke 24. The lower ends of these springs are anchored to the movable frame in a manner hereinafter described. When a load to be weighed is placed on the weighing platform, the resulting downward movement of the movable frame is opposed by the springs, the frame having a movement proportioned to the superimposed weight. Upon removal of the load, the springs re-contract and return the parts to initial position.

While the weighing springs may be anchored to the movable frame in any suitable manner, as here shown as an example, gripped between two lower turns of each spring is a washer 27, dished as shown in Fig. 3 and distorted to conform to the convolutions of the spring. Passing through a suitable hole in the washer is an anchoring bolt 28 having a rounded head 29. This bolt passes through a suitable hole in a cross piece 30 of the movable frame and has, below the cross piece, an adjustably mounted abutment nut 31. When the platform and its frame are moved downwardly under the load, cross piece 30, bearing against nuts 31, causes the bolts to extend the springs through heads 29 and washers 27. Heads 29 and the holes in the washers are machined to size and provide a swivel or ball-and-socket connection that permits the springs to center themselves without binding. With this construction, the springs will be equally tensioned throughout, promoting scale accuracy. As shown in Figure 3, in the present embodiment, the head of nut 31 takes into a beveled recess in the cross piece and centers the bolt against side sway.

In the construction here illustrated, the several guiding links are pivoted in a manner to prevent sidewise yield or loosening of the pivot. Referring to Figure 1, link 18 is pivoted to a boss, or anchorage element 75 by a pivot screw 76. Adjacent the head of this screw is an unthreaded shank portion 74 which serves as a pivotal bearing for the link. The boss is reamed to receive part of the shank. When the screw is tightened up, the shank is driven home into the reamed hole. This construction gives the effect of a driven-in stud and prevents sidewise yield and loosening of the screw under heavy or uneven loads.

There is provided means for adjusting the initial position of the parts. To this end, as here shown, the hanger 23 for the yoke 24 is in the form of a bell crank lever pivotally mounted in the main frame by means of a pivot pin 70 (Fig. 4). The downwardly extending arm 71 of this bell crank is arranged to be engaged by the end of an adjusting set screw 72 threaded through the wall of the main frame housing. By advancing the adjusting screw 72, the bell crank is moved to cause hanger arm 23 to give the movable frame a raised initial position. When the adjusting screw is withdrawn, the bell crank reverses, the movable frame taking a lower initial position. With this construction, the pointer hereinafter described can be given a plus or minus zero setting.

There is provided a dial housing and a horizontal dial having a pointer and an operating connection for causing registering movement of the pointer upon movement of the movable frame. As here shown as an example, on the front of the scale beneath the platform is a dial housing or casing 34 having a horizontal glass face 35, a graduated dial 36 beneath said glass and a vertical shaft 37 carrying a pointer 38 for indicating readings on the dial. The casing and associated parts are carried on a horizontal part of the frame of the scales, the casing being secured thereto as by screws 39. The person standing on the weighing platform can look straight down and see through the glass the indication of his weight. To permit a full and unobstructed view of the dial face, the platform is recessed away, as shown in Figure 1.

The operating connection for causing registering movement of the pointer upon movement of the movable frame includes a rack 40 which meshes with a pinion 41 on the pointer shaft. As here shown, shaft 37 is supported and journalled at its lower end in a tubular cage 42 which houses the pinion and sets at its lower end in the horizontal part of the frame. This cage is open at one side to permit the pinion to mesh with the rack. The upper end of the shaft runs in a bearing 43 in the tubular cage. Above the cage is a retaining cap 42a having an offset and downturned extension 44. This extension has a foot 44a which is secured to the frame by one of the screws 39 (Fig. 2). The vertical portion of extension 44 serves as a back retainer for the rack to hold it in meshing engagement with the pinion.

The invention in its entirety includes provision for supporting and for permitting movement of said rack without appreciable friction. In the embodiment shown, the rack runs on a ball bearing 45 located below the rack. This ball bearing rolls freely in an oversize race bounded by dial cage 42, extension 44, and two wing pieces 45a formed on the cage. During final damping movements of the weight-registering parts the rack rolls the bearing and this rolling connection prevents any tendency of the rack to stick and so provides a maximum of accuracy in registration. Upon the sudden application or removal of the load, the rack may slide without rolling the ball bearing. This, however, is immaterial as in any event the anti-friction action is obtained for final damping.

Means are provided for connecting the rack to the movable frame whereby the movements of the latter are communicated to said rack. As here shown, the rack is turned angularly at one end 50 and connected to the end of a vertically movable lever 51 as by screw 52 at said end. A bracket 53 is associated with said lever and a spring 54 is tensioned between said bracket and the rack to take up looseness in said pivot, one end of said spring hooking into a hole 55 in the rack and the other end in a hole in an angular extension 56 of the bracket.

In structures embodying the invention in its entirety there is provided a spring tension connection between the movable platform frame and lever 51. In the present exemplification, lever 51 is rigidly secured, as by welding, between the two arms of a lever 57 pivoted to the stationary frame at 58. The free end of lever 51 has a spring connection with the movable frame. As shown, clamped to a bar 61, forming part of the movable frame, by means of a clamping piece 62 and screws 63, is a U-shaped wire spring 60. The bight portion of this U-shaped spring takes into a notch 64 in the end of lever 51. As the platform frame moves up and down this wire spring pivots in the notch and serves as an operating connection between the frame and lever 51 to actuate the latter and so rotate the pointer through the rack and pinion connection above described. This spring connection is under tension, e. g. to the left as viewed in Fig. 4, and so serves to take up any play in the pivots due to wear, in inaccuracies, or the like. With the construction described a maximum of accuracy in scale reading is obtained.

The end of lever 51 is provided with two safety notches 65 located at either side, respectively, of notch 64. In case platform movements tend to force spring 60 out of its notch 64, the bight of the spring will slip into one or the other of these notches 65, being later returned to notch 64 automatically as the parts return to normal position. This construction prevents any separation of the spring from the lever.

What is claimed is:

1. In a scale, and in combination, a stationary frame, a vertically movable platform frame, a weighing-spring connection between the movable frame and the stationary frame, a dial having a horizontal face, a pointer movable over said dial, and an operating connection for causing rotation of said pointer upon movements of said movable frame, said connection including a lever provided with a notch, and a thrust-exerting spring element in engagement with said notch and urged by its spring tension into said notch in a direction at an angle to its direction of thrust.

2. In a scale, and in combination, a stationary frame, a platform frame vertically movable therein, a weighing-spring connection between the movable frame and the stationary frame, a horizontal dial, a pointer movable over said dial, a rack and pinion for rotating said pointer, a vertically movable three-armed rocking lever connected with said rack to actuate the same, and a thrust-exerting spring connection between said lever and the platform frame.

3. In a scale, and in combination, a stationary frame, a platform frame movable therein, a weighing-spring connection between the movable frame and the stationary frame, weight-registering means, means including a pivoted lever for actuating said registering means, and an operating connection between said lever and the platform frame, said connection including a lever actuating spring element.

4. In a scale, and in combination, a stationary frame, a platform frame movable therein, a weighing-spring connection between the movable frame and the stationary frame, weight-registering means, means including a pivoted lever for actuating said registering means, said lever having a notch in one end, and a U-shaped spring element having its ends secured to the platform frame and its bight pivoted in said notch.

5. In a scale, and in combination, a stationary frame, a platform frame movable therein, a weighing-spring connection between the movable frame and the stationary frame, weight-registering means, means including a pivoted lever for actuating said registering means, said lever having a notch in one end, and a U-shaped spring element having its ends secured to the platform frame and its bight pivoted in said notch, said lever having safety notches at either side of said first mentioned notch for receiving said spring element upon displacement from normal position.

6. In a scale, and in combination, a stationary frame, a platform frame vertically movable therein, a weighing-spring connection between the movable frame and the stationary frame, a horizontal dial, a pointer movable over said dial, a vertical pinion connected with said pointer, a rack meshing with said pinion, a vertically movable lever having one end pivoted to said rack, a lever pivoted to the stationary frame and rigidly secured to said lever, and an operating connection between the other end of said lever and the platform frame.

7. In a scale, and in combination, a stationary frame, a platform frame movable therein, a weighing-spring connection between said frames, a horizontal dial, a pointer movable over said dial, a vertical shaft on which said pointer is mounted, a pinion on said shaft, a rack meshing with said pinion, an operating connection between said rack and the platform frame, and a ball bearing support for said rack.

8. In a scale, and in combination, a stationary frame, a platform frame movable therein, a weighing-spring connection between said frames, a horizontal dial, a pointer movable over said dial, a vertical shaft on which said pointer is mounted, a pinion on said shaft, a pinion housing, a rack meshing with said pinion, an operating connection between said rack and the platform frame, parts associated with said housing forming a race, and a ball bearing located in said race and on which said rack has a support.

In testimony whereof, I have hereunto set my hand.

FREDERICK E. CARLSON.